US008422549B2

(12) United States Patent
Shin et al.

(10) Patent No.: US 8,422,549 B2
(45) Date of Patent: Apr. 16, 2013

(54) METHOD AND APPARATUS FOR TRANSMITTING AND RECEIVING UNCOMPRESSED AUDIO/VIDEO DATA AND TRANSMISSION FRAME STRUCTURE

(75) Inventors: Se-young Shin, Suwon-si (KR); Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1711 days.

(21) Appl. No.: 11/715,926

(22) Filed: Mar. 9, 2007

(65) Prior Publication Data

US 2007/0258651 A1  Nov. 8, 2007

Related U.S. Application Data

(60) Provisional application No. 60/796,890, filed on May 3, 2006.

(30) Foreign Application Priority Data

Sep. 12, 2006  (KR) ........................ 10-2006-0088280

(51) Int. Cl.
*H04B 1/00* (2006.01)
(52) U.S. Cl.
USPC ...... 375/240.01; 709/230; 709/231; 709/233; 725/143; 710/19; 714/798; 714/799
(58) Field of Classification Search .................. 375/240; 709/230, 231, 233; 725/143; 710/19; 714/798, 714/799
See application file for complete search history.

(56) References Cited

U.S. PATENT DOCUMENTS

| 5,563,895 | A | * | 10/1996 | Malkamaki et al. | .......... 714/748 |
| 6,040,879 | A | * | 3/2000 | Park | ......................... 375/240.27 |
| 6,529,528 | B1 | * | 3/2003 | Park et al. | ..................... 370/535 |
| 7,386,641 | B2 | * | 6/2008 | Xu et al. | ........................ 710/19 |

(Continued)

FOREIGN PATENT DOCUMENTS

| EP | 1694016 A1 | 8/2006 |
| GB | 2 291 570 A | 1/1996 |

(Continued)

OTHER PUBLICATIONS

Communication from the Japanese Patent Office dated Aug. 30, 2011, issued in corresponding Japanese Patent Application No. 2009-509408.

(Continued)

*Primary Examiner* — Kambiz Zand
*Assistant Examiner* — Sayed Beheshti Shirazi
(74) *Attorney, Agent, or Firm* — Sughrue Mion, PLLC

(57) ABSTRACT

An apparatus for efficiently transmitting and receiving uncompressed AV data by using UEP during high-frequency wireless communication, as well as a transmission frame structure to which the UEP is applied are provided. A method of transmitting uncompressed AV data includes determining whether a transmission efficiency of uncompressed AV data drops below a threshold while the uncompressed AV data is transmitted; deciding whether to use a UEP mode if it is determined that the transmission efficiency has dropped below the threshold, the UEP mode indicating a manner of dividing bits, the bits constituting the uncompressed AV data, into significant bits and non-significant bits; and retransmitting the uncompressed AV data by using the UEP mode based on decision regarding use of the UEP mode.

33 Claims, 8 Drawing Sheets

U.S. PATENT DOCUMENTS

| | | | |
|---|---|---|---|
| 7,548,675 B2 * | 6/2009 | Tatum et al. | 385/100 |
| 8,050,203 B2 * | 11/2011 | Jacobsen et al. | 370/310 |
| 2002/0010938 A1 | 1/2002 | Zhang et al. | |
| 2002/0146074 A1 | 10/2002 | Ariel et al. | |
| 2002/0157058 A1 * | 10/2002 | Ariel et al. | 714/774 |
| 2003/0229822 A1 * | 12/2003 | Kim et al. | 714/18 |
| 2004/0083417 A1 | 4/2004 | Lane et al. | |
| 2005/0013391 A1 * | 1/2005 | Boer et al. | 375/340 |
| 2005/0144643 A1 * | 6/2005 | Hakenberg et al. | 725/86 |
| 2005/0249244 A1 * | 11/2005 | McNamara et al. | 370/474 |
| 2006/0005106 A1 * | 1/2006 | Lane et al. | 714/758 |
| 2006/0056443 A1 * | 3/2006 | Tao et al. | 370/462 |
| 2006/0153155 A1 * | 7/2006 | Jacobsen et al. | 370/338 |
| 2006/0153250 A1 * | 7/2006 | Martini et al. | 370/537 |
| 2007/0198887 A1 * | 8/2007 | Reznic et al. | 714/752 |
| 2007/0233906 A1 * | 10/2007 | Tatum et al. | 710/26 |
| 2007/0260965 A1 * | 11/2007 | Schmidt et al. | 714/799 |
| 2007/0292135 A1 * | 12/2007 | Guo et al. | 398/106 |
| 2008/0049707 A1 * | 2/2008 | Kwon et al. | 370/343 |
| 2009/0017814 A1 * | 1/2009 | Horiuchi et al. | 455/422.1 |
| 2009/0327696 A1 * | 12/2009 | Hatlelid et al. | 713/151 |

FOREIGN PATENT DOCUMENTS

| | | |
|---|---|---|
| JP | 4-260237 A | 9/1992 |
| JP | 7-74733 A | 3/1995 |
| JP | 8-116313 A | 5/1996 |
| JP | 2005175645 A | 6/2005 |
| JP | 2006505193 A | 2/2006 |
| KR | 2000-0031029 A | 6/2000 |
| WO | WO 2006/011699 A1 | 2/2006 |

OTHER PUBLICATIONS

Taddei et al., "Mode Adaptive Unequal Error Protection for Transform Predictive Speech and Audio Coders," Acoustics, Speech, and Signal Processing (ICASSP), 2002 IEEE International Conference, May 2002, pp. I-165-I-168, vol. 1.

Zhang et al., "Channel-Adaptive Resource Allocation for Scalable Video Transmission Over 3G Wireless Network," IEEE Transactions on Circuits and Systems for Video Technology, Aug. 2004, pp. 1049-1063, vol. 14, No. 8.

Communication dated Feb. 1, 2013 issued by the European Patent Office in counterpart European Patent Application No. 07746266.1.

Communication dated Feb. 14, 2013 issued by the European Patent Office in counterpart European Patent Application No. 07746266.1.

\* cited by examiner

FIG. 4b

PHY HEADER (720)

| HRP mode index | MPDU length | Beam tracking | Error protection | UEP offset | Reserved |
|---|---|---|---|---|---|
| 720a | 720b | 720c | 720d | 720e | 720f |

FIG. 5

| HRP mode index | Coding Mode | Modulation Mode | CODING RATIO | |
|---|---|---|---|---|
| | | | FIRST GROUP [7] [6] [5] [4] | SECOND GROUP [3] [2] [1] [0] |
| 0 | EEP | QPSK | 1/3 | |
| 1 | | QPSK | 2/3 | |
| 2 | | 16-QAM | 2/3 | |
| 3 | UEP | QPSK | 4/7 | 4/5 |
| 4 | | 16-QAM | 4/7 | 4/5 |
| 5 | RETRANSMISSION | QPSK | 1/3 | infinite |
| 6 | | 16-QAM | 1/3 | infinite |

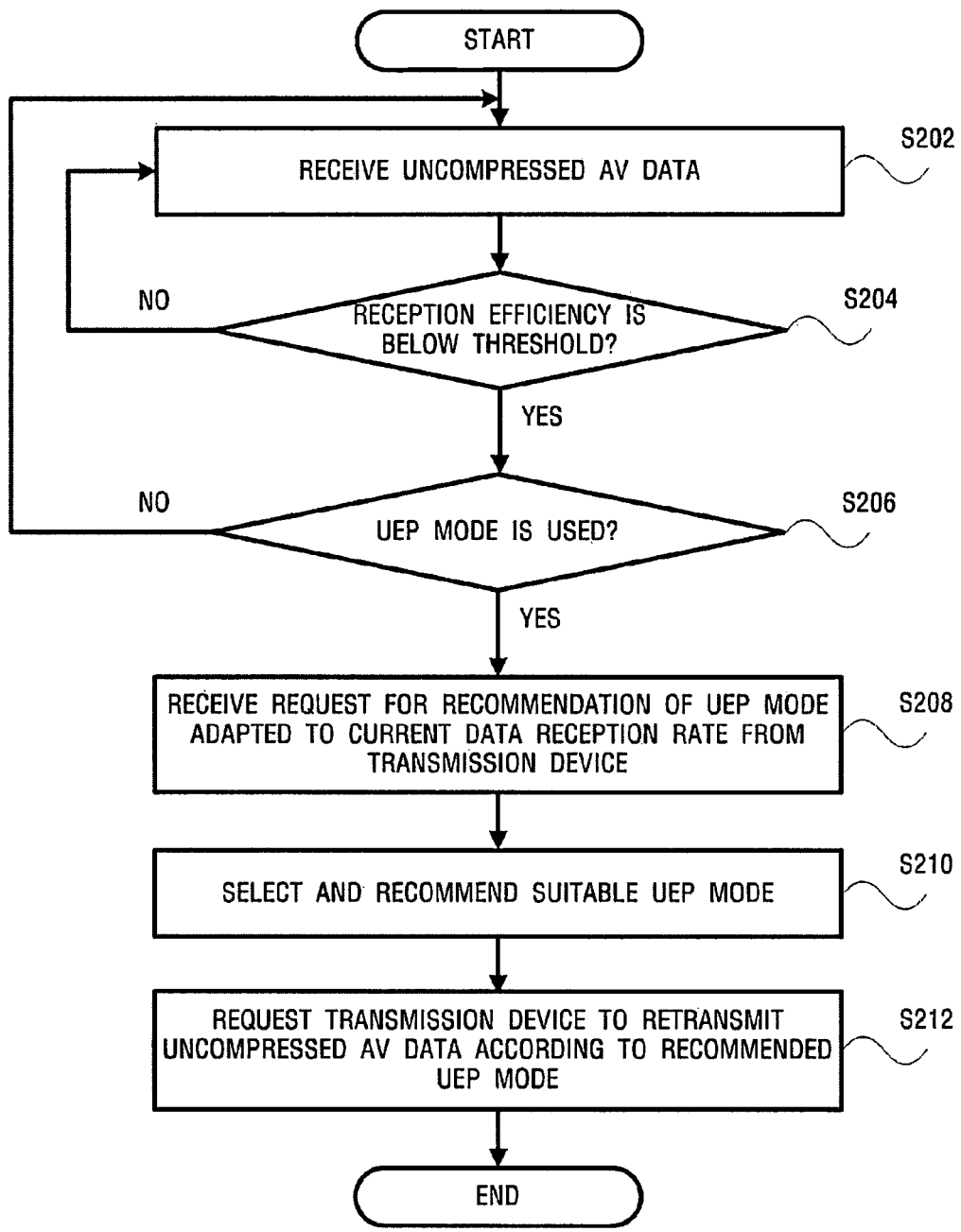

METHOD AND APPARATUS FOR TRANSMITTING AND RECEIVING UNCOMPRESSED AUDIO/VIDEO DATA AND TRANSMISSION FRAME STRUCTURE

CROSS-REFERENCE TO RELATED APPLICATION

This application claims priority from Korean Patent Application No. 10-2006-0088280 filed on Sep. 12, 2006 in the Korean Intellectual Property Office, and U.S. Provisional Patent Application No. 60/796,890 filed on May 3, 2006 in the United States Patent and Trademark Office, the disclosures of which are entirely incorporated herein by reference.

BACKGROUND OF THE INVENTION

1. Field of the Invention

Apparatuses and methods consistent with the present invention relate to wireless communication technology, and more particularly, to efficiently transmitting and receiving uncompressed audio/video data by using unequal error protection during high-frequency wireless communication, as well as a transmission frame structure to which unequal error protection is applied.

2. Description of the Related Art

Wireless networks are extensively used in the industry, and there exists an increased demand for large-capacity multimedia data transmission. Consequently, much research is being conducted with regard to efficient transmission methods in wireless network environments. Particularly, demand is growing for high-quality video data (e.g., digital versatile disk (DVD)-grade or high definition television (HDTV)-grade video data) transmissions between various home devices in a wireless manner.

The Institute of Electrical and Electronics Engineers (IEEE) 802.15.3c task group is in the process of establishing a technical standard regarding large-capacity data transmission in wireless home networks. This standard, referred to as Millimeter Wave (mm Wave), utilizes radio waves having a millimeter wavelength (i.e., radio waves having a frequency of 30 GHz to 300 GHz) for large-capacity data transmissions. This range of frequency has been used in related art as unlicensed bands for limited applications (e.g., for communication operators, radio astronomy, and vehicular collision avoidance).

FIG. 1 shows the comparison between the frequency band of the IEEE 802.11 series standards and that of mm Wave. It is clear from the drawing that the IEEE 802.11b standard or the IEEE 802.11g standard has a carrier wave frequency of 2.4 GHz and a channel bandwidth of about 20 MHz. In addition, the IEEE 802.11a standard or the IEEE 802.11n standard has a carrier wave frequency of 5 GHz and a channel bandwidth of about 20 MHz. In contrast, mm Wave has a carrier wave frequency of 60 GHz and a channel bandwidth of about 0.5-2.5 GHz. As such, compared with conventional IEEE 802.11 series standards, mm Wave has much higher carrier wave frequency and a larger bandwidth. Such use of high-frequency signals having a millimeter wavelengths (i.e. millimeter waves) ensures a very high transmission rate (measured in Gbps). Since antennas having a size of 1.5 mm or less are used, a single chip incorporating the antennas can be realized. Furthermore, a very high attenuation ratio in the air reduces the interference between devices.

Presently, various research is being conducted to see how well uncompressed audio or video (AV) data can be transmitted between wireless devices using millimeter waves. When the compressed AV data undergoes motion compensation, discrete cosine transform (DCT) conversion, quantization, and variable-length coding so as to remove parts to which the human visual and auditory senses are less sensitive, information is lost. In contrast, uncompressed AV data retains digital values indicating pixel components (e.g., red (R), green (G), blue (B) components).

As such, bits included in compressed AV data have the same degree of significance while those included in uncompressed AV data have different degrees of significance. In the case of the eight-bit image shown in FIG. 2, for example, a pixel component is expressed by eight bits. A bit indicating the highest order (bit at the topmost level) is the most significant bit (MSB), and a bit indicating the lowest order (bit at the bottommost level) is the least significant bit (LSB). Namely, each bit of one-byte data, which consists of eight bits, has different degrees of significance in restoring video or audio signals. When an error has occurred in a bit having higher significance, the error is more likely to be detected than in the case of a bit having lower significance. This means that bit data having higher significance must be protected against errors during wireless transmission with higher certainty than that of bit data having lower significance. However, related art transmission modes based on the IEEE 802.11 series standards employ error protection and retransmission modes using the same coding ratio for all bits to be transmitted.

FIG. 3 shows the structure of a physical (PHY) Protocol Data Unit (PPDU) 30 of the IEEE 802.11a standard. The PPDU 30 includes a preamble, a signal field, and a data field. The preamble consists of signals for PHY layer synchronization and channel estimation, particularly a plurality of short training signals and long training signals. The signal field includes a RATE field indicating the transmission rate and a LENGTH field indicating the length of the PPDU. The signal field also includes a reserved bit, a parity bit, and a tail bit. The signal field is generally coded by a symbol. The data field consists of a physical layer service data unit (PSDU), a tail bit, and a pad bit. The PSDU contains data to be transmitted.

The data recorded on the PSDU is composed of codes which have been encoded by a convolution encoder or Reed-Solomon (RS) encoder. The data has the same degree of significance and is coded under the same error protection. Consequently, each part of the data has the same error protection capability. When the reception side finds an error and solicits retransmission from the transmission side (e.g., via an acknowledgment (ACK)), the transmission side retransmits all of the corresponding data. Such a related art method has a problem in that, apart from normal data transmission, the significance of data to be transmitted varies. This degrades the transmission condition of the channel.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for transmitting and receiving uncompressed audio/video data so that, when the data transmission/reception condition of a wireless device using high-frequency waves worsens, a media access control (MAC) layer can support unequal error protection for a basic layer.

The present invention also provides a transmission frame structure adapted to transmit large amounts of uncompressed audio/video data via a bandwidth of Gbps grade by using the unequal error protection technique.

According to an aspect of the present invention, there is provided a method of transmitting uncompressed AV data, the method including determining whether the transmission efficiency of uncompressed AV data drops below a predetermined threshold while the uncompressed AV data is transmitted; deciding whether to use an unequal error protection (UEP) mode when it has been determined that the transmission efficiency has dropped below the threshold, the UEP mode indicating a manner of dividing bits, the bits constituting the uncompressed AV data, into significant bits and non-significant bits; and retransmitting the uncompressed AV data by using the UEP mode based on a decision regarding use of the UEP mode.

According to another aspect of the present invention, there is provided a method of receiving uncompressed AV data, the method including determining whether the reception efficiency of uncompressed AV data drops below a predetermined threshold while the uncompressed AV data is being received; confirming whether a UEP mode is used when it has been determined that the reception efficiency has dropped below the threshold, the UEP mode indicating a manner of dividing bits, the bits constituting the uncompressed AV data, into significant bits and non-significant bits; and requesting retransmission of uncompressed AV data when it has been confirmed that the UEP mode has been used, the UEP mode having been used for the uncompressed AV data.

According to another aspect of the present invention, there is provided an apparatus for transmitting uncompressed AV data, the apparatus including a transmission-efficiency-determination unit determining whether a transmission efficiency of uncompressed AV data drops below a predetermined threshold while the uncompressed AV data is transmitted; a UEP mode decision unit deciding whether to use a UEP mode when it has been determined that the transmission efficiency has dropped below the threshold, the UEP mode indicating a manner of dividing bits, the bits constituting the uncompressed AV data, into significant bits and non-significant bits; a channel coding unit performing coding of the uncompressed AV data by using the UEP mode based on a decision regarding use of the UEP mode; and an RF unit retransmitting the uncompressed AV data coded by the channel coding unit.

According to another aspect of the present invention, there is provided an apparatus for receiving uncompressed AV data, the apparatus including a reception-efficiency-determination unit determining whether a reception efficiency of uncompressed AV data drops below a predetermined threshold while the uncompressed AV data is being received; a channel-decoding unit confirming whether a UEP mode is used and decoding the uncompressed AV data when it has been determined that the reception efficiency has dropped below the threshold, the UEP mode indicating a manner of dividing bits, the bits constituting the uncompressed AV data, into significant bits and non-significant bits; and a retransmission request unit requesting retransmission of uncompressed AV data when it has been confirmed that the UEP mode has not been used, the UEP mode having been used for the uncompressed AV data.

According to another aspect of the present invention, there is provided a transmission frame structure for transmitting uncompressed AV data, the structure including a payload having a plurality of transmission data units classified in accordance with significance of bits constituting the uncompressed AV data, the transmission data units having been subjected to error-protection coding at a predetermined coding ratio; an MAC header added to the payload, a link adaptation field (LAF) having been set up in the MAC header so as to code the uncompressed AV data by using a UEP mode indicating a manner of dividing bits, the bits constituting the uncompressed AV data, into significant bits and non-significant bits; and a PHY header added to the MAC header, the PHY header containing information regarding whether the UEP mode is used, wherein the MAC header contains a UMR field and a UMRI field endowed with an ID of the UMR field, the UMR field requesting a reception device to recommend a UEP mode adapted to a current transmission efficiency.

BRIEF DESCRIPTION OF THE DRAWINGS

The above and other aspects of the present invention will be apparent from the following detailed description of exemplary embodiments taken in conjunction with the accompanying drawings, in which:

FIG. 4b shows the structure of a PHY header according to an embodiment of the present invention;

FIG. 5 shows a high rate PHY (HRP) mode index table according to an exemplary embodiment of the present invention;

FIG. 11 is a flowchart showing a series of steps of method for receiving uncompressed AV data according to an exemplary embodiment of the present invention.

DETAILED DESCRIPTION OF THE EXEMPLARY EMBODIMENTS

Figure 1:
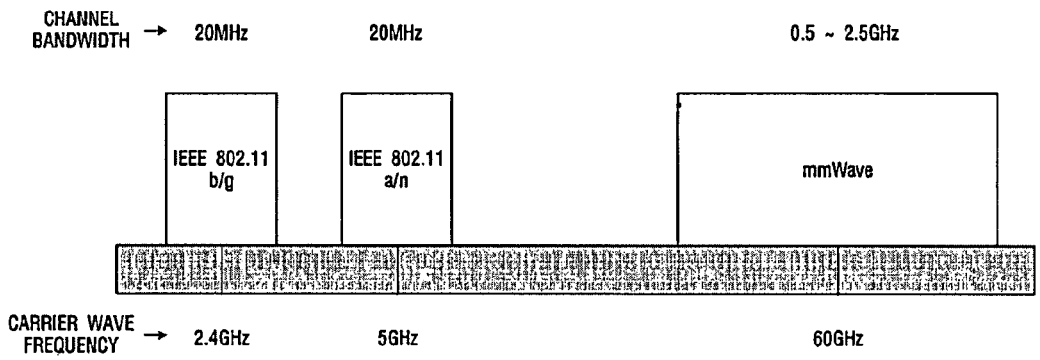
FIG. 1 shows the comparison between the frequency band based on IEEE 802.11 series and that based on mm Wave.
Figure 2:
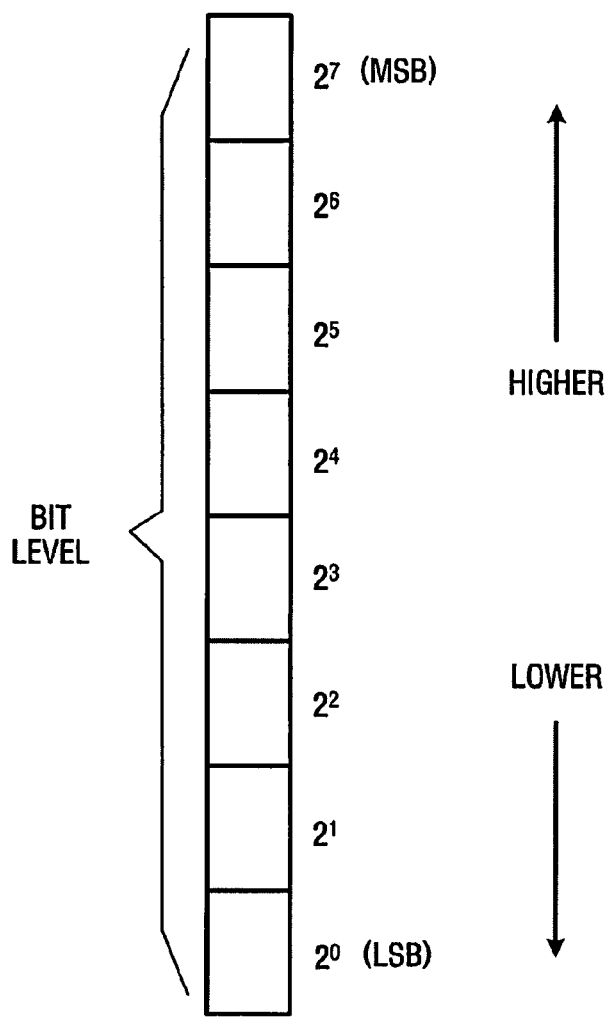
FIG. 2 shows a pixel component in terms of a plurality of bit levels.

Hereinafter, exemplary embodiments of the present invention will be described with reference to the accompanying drawings. The matters defined in the description such as a detailed construction and elements are provided to assist in a comprehensive understanding of the invention. Thus, it should be apparent that the present invention can be carried out without those defined matters. In the following description of exemplary embodiments of the present invention, the same drawing reference numerals are used for the same elements even in different drawings. Also, a detailed description of known functions and configurations incorporated herein will be omitted when it makes the subject matter of the present invention unclear.

The present invention is described hereinafter with reference to flowchart or block diagram illustrations of a method and an apparatus for transmitting and receiving uncompressed AV data, as well as a transmission frame structure, according to exemplary embodiments of the present invention.

It will be assumed that 8 bits are transmitted for each of R, G, and B video signals and that signal R includes a total of eight bits of data: R[7], R[6], R[5], R[4], R[3], R[2], R[1], and R[0] (R[7] is the MSB and R[0] is the LSB). It should be noted that, in this case, the extent to which humans can perceive an error of bit R[7] is very different from that of R[0]. Therefore, bit R[7], which has higher significance, needs to be given more protection against errors by using a more efficient error protection technique considering the extent of human perception. One such error protection technique is UEP, which is supported by an MAC layer during high-frequency wireless communication. A BB layer is in charge of the UEP. Algorithms for performing UEP in conformity with each bit while maintaining a constant transmission rate include Bose, Ray-Chaudhuri, Hocquenghem (BCH), RS coding, convolution coding, Turbo coding, and low-density parity-check (LDPC) coding. By adjusting the division ratio between significant and non-significant bits, it is possible to reduce the occurrence of errors perceivable by humans.

The structure of a transmission frame, to which UEP may be applied so as to reduce the occurrence of errors, will now be described with reference to FIG. 4a.

Figure 4A:
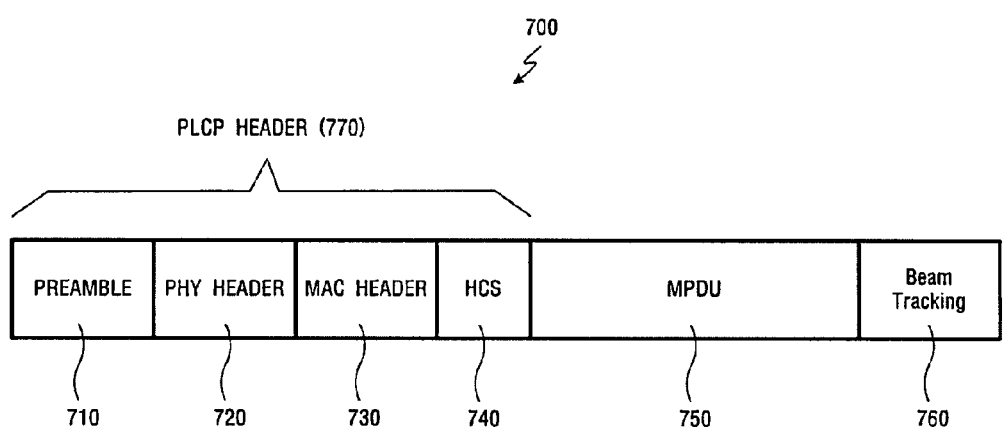
FIG. 4a shows the structure of a transmission frame according to an exemplary embodiment of the present invention.

Referring to FIG. 4a, the transmission frame 700 includes a Physical Layer Convergence Protocol (PLCP) header 770, an MAC protocol data unit (MPDU) field 750, and a beam tracking field 760. The PLCP header 770 may consist of a preamble 710, a PHY header 720, an MAC header 730, and a header check sequence (HSC) field 740.

The preamble 710 consists of signals for PHY layer synchronization and channel estimation, particularly a plurality of short training signals and long training signals. The PHY header 720 refers to a region created according to information used in the PHY layer. The MAC header 730 refers to a region created according to information used in the MAC layer, and information for media access control is recorded in the MAC header 730. Particularly, the MAC header 730 is used for MAC media access control as in the case of IEEE 802.11 series standards or IEEE 802.3 standards. The HCS field 740 refers to a region used to check whether an error has occurred in the PLCP header 770.

The MPDU field 750 refers to a region for recording a plurality of transmission data units (TDUs) to be transmitted, i.e., uncompressed AV data which has been subjected to error-protection coding at a predetermined coding ratio. During the error-protection coding, the same coding ratio is used for the same number of TDUs. The TDUs may be arranged in order of increasing or decreasing significance.

The beam tracking field 760 refers to a region in which additional information for beam steering is recorded. As used herein, the beam steering refers to setting up the directionality of antennas in accordance with the reception direction of radio signals.

FIG. 4b shows the structure of a PHY header 720 according to an exemplary embodiment of the present invention. As shown in FIG. 4b, the PHY header 720 includes an HRP mode index field 720a, an MPDU length field 720b, a beam tracking field 720c, an error protection field 720d, a UEP offset field 720e, and a reserved field 720f.

Figure 3:
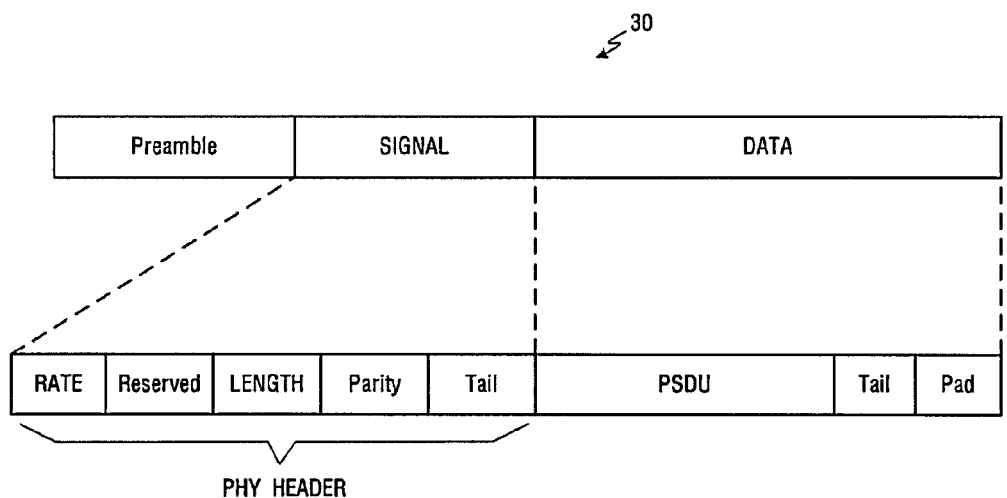
FIG. 3 shows the structure of a PPDU based on the IEEE 802.11a standard.

Considering that a transmission rate of at least 3 Gbps is used to transmit uncompressed AV data according to exemplary embodiments of the present invention, the PHY header 720 needs to be somewhat different from the PHY header shown in FIG. 3. In this regard, the PHY header 720 shown in FIG. 4b is referred to as an HRP header.

The HRP mode index field 720a contains a number of pieces of information, particularly the number of groups included in the MPDU 750, the coding ratio applied to each group, and the modulation mode. According to an exemplary embodiment of the present invention, the HRP mode index 720a is defined so as to have any value selected from 0-6, as is clear from the table shown in FIG. 5. Although respective fields may be arranged so as to indicate different items of grouping information (the number of bit levels included in a group), coding ratio, and modulation mode, use of the mode index is advantageous in that a single index can represent the combination of a plurality of items. The transmission mode table shown in FIG. 5, which corresponds to the mode index, is either predefined between the transmission and reception devices or transmitted from the transmission device to the reception device.

It is clear from the table shown in FIG. 5 that equal error protection (EEP) is applied to a case in which the HRP mode index has a value in the range of 0-2, and UEP is applied to two separate groups if the HRP mode index has a value in the range of 3-4. In this case, the first group includes four higher bit levels of [7], [6], [5], and [4], and the second group includes four lower bit levels of [3], [2], [1], and [0]. Although it has been assumed in the table that there are two separate groups when the UEP is applied, the number of separate groups and the number of bit levels belonging to corresponding groups may be varied as desired. In the case of 8-bit data, for example, the maximum number of separate groups is 8.

During retransmission, the first group, which has higher significance, is retransmitted at a coding ratio of 1/3, while the second group, which has lower significance, is not retransmitted (i.e., its coding ratio is infinite). This is because, unlike compressed AV data, each bit of uncompressed AV data has different degrees of significance, and higher levels of bits (i.e., bits having have higher significance) must be protected against errors during transmission.

The numerator of the coding ratio corresponds to the number of inputted bits, and the denominator corresponds to the bit number of a converted codeword. This means that the lower the coding ratio is (i.e., the larger the denominator is), the larger the error protection probability becomes, because the coding process results in a larger bit of codeword for the same input bit. When the HRP mode index of the table is in the range of 3-6 (UEP mode and retransmission mode), the coding ratio of the first group, which has a higher level, is lower than that of the second group, which has a lower level.

Figure 6:
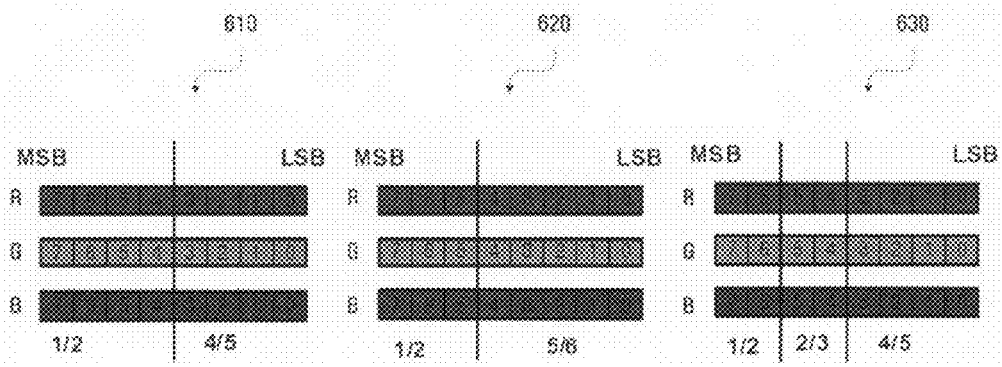
FIG. 6 shows various ratios for dividing bit blocks.

FIG. 6 shows various ratios for dividing bit blocks. In the case of 8 bits, for example, they may be divided into significant and non-significant bits in various manners. In the case indicated by reference numeral 610, bits [0]-[3] are classified as LSBs, and bits [4]-[7] as MSBs. Then, the LSBs are coded at a coding ratio of 4/5, and the MSBs at 1/2. In the case indicated by reference numeral 620, bits [0]-[4] are classified as LSBs, and bits [5]-[7] as MSBs. Then, the LSBs are coded at a coding ratio of 5/6, and the MSBs at 1/2. In the case indicated by 630, bits [0]-[3] are classified as LSBs, bits [4] and [5] as intermediate bits, and bits [6] and [7] as MSBs. Then, the LSBs are coded at a coding ratio of 4/5, the intermediate bits at 2/3, and the MSBs at 1/2.

As such, according to an exemplary embodiment of the present invention, the division ratio can be adapted to the current transmission efficiency by varying the division ratio between MSBs and LSBs and by designating different coding ratios for respective division ratios.

Referring to FIG. 4b, the MPDU length field 720b represents the size of the MPDU 750 in terms of octets. The MPDU length field 720b is necessary for accurate reading of the MPDU 750, which has a variable size. For example, the MPDU length field 720b may consist of 20 bits.

The beam tracking field 720c, which is a 1-bit field, is designated as 1 if the transmission packet includes additional information for beam steering, and 0 if not. Particularly, the beam tracking field 720c is designated as 1 if the beam tracking field 760 has been added to the MPDU 750 in FIG. 4a, and 0 if not.

The error protection field 720d indicates whether UEP is applied to bits included in the MPDU 750. Particularly, the error protection field 720d can indicate which of various UEP modes is employed, as labeled "UEP field" in FIG. 7.

The UEP offset field 720e indicates the number of a symbol, which corresponds to the beginning of UEP coding, when counted from the first symbol after the MAC header 730. Particularly, the UEP offset field 720e may consist of 10 bits.

The reserved field 720f is reserved for future use.

Figure 7:
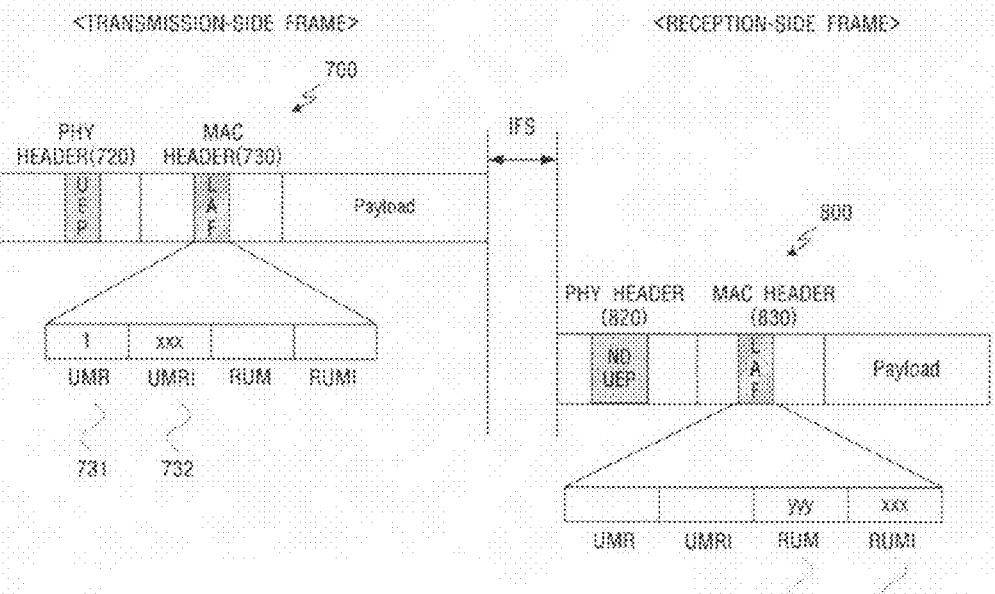
FIG. 7 shows the structure of frames on the transmission and reception sides, to which a UEP mode according to an exemplary embodiment of the present invention is to be applied.

The role of the PHY header and the MAC header in the transmission frame structure according to an exemplary embodiment of the present invention will now be described in more detail with reference to FIG. 7, which shows the structure of frames on the transmission and reception sides, to which a UEP mode according to an exemplary embodiment of the present invention is to be applied. For clarity, it is assumed in FIG. 7 that, unlike the transmission frame 700 shown in FIG. 4a, each frame solely consists of a PHY header, an MAC header, and a payload.

The payload consists of a plurality of TDUs which are classified in accordance with the significance of bits constituting uncompressed AV data and which have been subjected to error-protection coding at a predetermined coding ratio. The payload corresponds to the MPDU field 750 shown in FIG. 4a.

The PHY header 720 or 820 is added to the MAC header 730 or 830 (described later) and contains information regarding whether the UEP mode is used. In this case, the UEP mode indicates a manner of dividing bits, which constitute the uncompressed AV data, into significant and non-significant bits. The PHY header 720 or 820 may further include information regarding the number of bit levels included in the TDUs, information regarding the modulation mode, and information regarding a mode index, which indicates the combination of the information regarding the number of bit levels and the information regarding the modulation mode. A table consisting of these pieces of information has already been described with reference to FIG. 5.

The MAC header 730 or 830 is added to the payload and has an LAF designated so as to code the uncompressed AV data by using the UEP mode. The MAC header 730 or 830 has four fields as its sub-fields.

When the current transmission efficiency degrades and exhibits poor transmission quality, a UEP mode request (UMR) field 731 of the transmission-side frame 700 requests the reception device that it recommend a UEP mode adapted to the current transmission efficiency, in order to improve the transmission efficiency. The UMR field 731 is designated as 1 when making such a request, and 0 when making no request. A UMR identifier (UMRI) field 732 is added to the UMR field 731 and is endowed with the identifier (ID) of the UMR field 731.

Instead of having empty UMR and UMRI fields, the reception-side frame 800 has information recorded in its recommended UEP mode (RUM) and recommended UEP mode identifier (RUMI) fields 833 and 834. When the UMR field of a received frame is 1, the RUM field 833 recommends a UEP mode suitable for the current data reception rate from the HRP mode index of the table shown in FIG. 5. An RUMI field 834 is added to the RUM field 833 and is endowed with the ID of the RUM field 833. When the reception efficiency drops below a predetermined threshold, the RUM field 833 recommends another UEP mode from the HRP mode index of the table shown in FIG. 5.

The channel condition varies drastically during high-frequency wireless communication, and the channel condition at the beginning of data transmission may be substantially different from that after a short period of time. Therefore, if the channel condition becomes worse than when it was set up before transmission begins, the mode of UEP conducted by the BB layer needs reconfiguration. Particularly, the PHY header 720 determines whether to use the UEP, and the MAC header 730 newly sets up the UEP mode by designating the LAF. Then, the LAF designates the UMR field 731 as 1 and notifies that it requests a suitable UEP mode. In addition, the LAF endows the UMRI field 732 with the ID of the UMR (i.e., UMRI) and transmits an ACK to the reception side. Upon receiving the ACK, the reception side selects a UEP mode, which is adapted to the current transmission efficiency, from a reference table as shown in FIG. 5. Then, the reception side designates an RUM and transmits it to the transmission side together with the RUMI. The transmission side applies the UEP mode, which has been newly set up, and transmits data to the reception side so as to reflect the changed channel condition.

Figure 8:
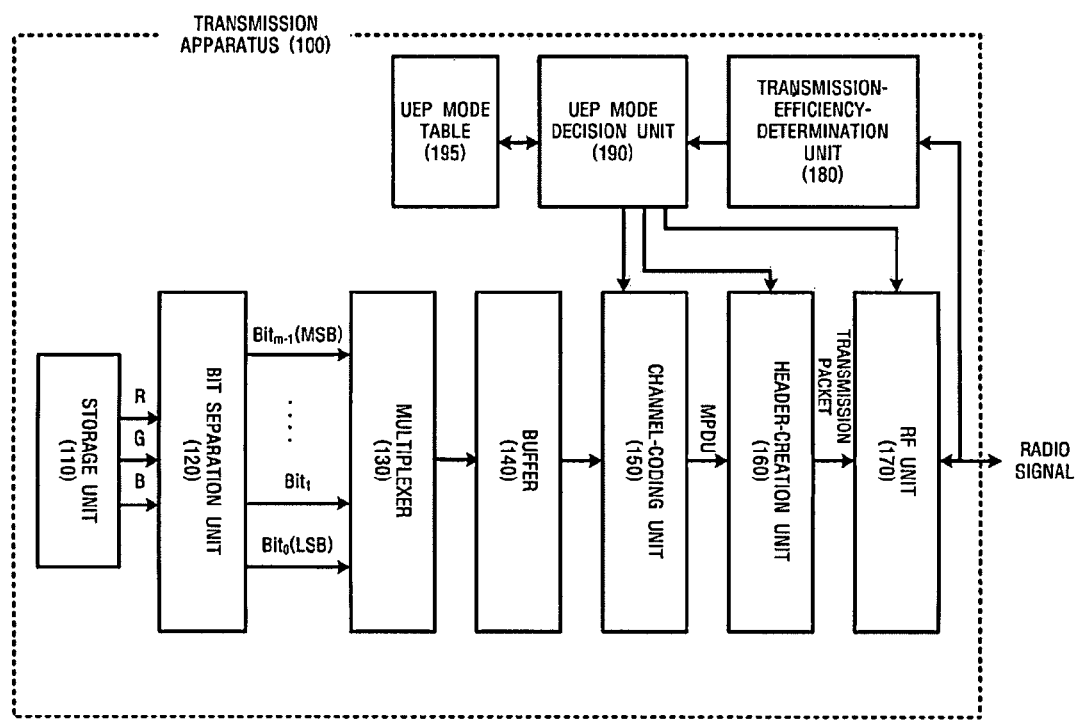
FIG. 8 shows the overall construction of an apparatus for transmitting uncompressed AV data according to an exemplary embodiment of the present invention.

FIG. 8 shows the overall construction of an apparatus 100 for transmitting uncompressed AV data according to an exemplary embodiment of the present invention. The transmission apparatus 100 may include a storage unit 110, a bit separation unit 120, a multiplexer 130, a buffer 140, a channel coding unit 150, a header creation unit 160, an radio frequency (RF) unit 170, a transmission-efficiency-determination unit 180, a UEP mode decision unit 190, and a UEP mode table 195.

The storage unit 110 stores uncompressed AV data. When the AV data is video data, the sub-pixel value for each pixel is stored. Although various sub-pixel values may be stored depending on the employed color space (e.g., the RGB color space or the luminance-chrominance (YCbCr) color space), it is assumed in the description of the present invention that each pixel consists of three sub-pixels of R, G, and B based on the RGB color space. It can be easily understood by those skilled in the art that, when gray images are given as the video data, there exists a single sub-pixel component, which may constitute a pixel on its own. Alternatively, two or four sub-pixel components may constitute a pixel.

The bit separation unit 120 separates a sub-pixel value, which has been provided by the storage unit 110, into bits ranging from the highest level to the lowest level. In the case of 8-bit video data, for example, the order ranges from $2^7$ to $2^0$, and the data may be separated into a total of 8 bits. In the FIG. 8, m refers to the bit number of the pixel, and $Bit_{m-1}$ refers to a bit with an order of m−1. Such a bit separation process is separately conducted for each sub-pixel.

In order to classify the separated bits according to the significance, the multiplexer 130 scans the separated bits based on the level and multiplexes them so as to constitute a plurality of TDUs. The buffer 140 temporarily stores the plurality of TDUs created by the multiplexer 130.

The channel coding unit 150 performs error-protection coding at a coding ratio determined for each TDU stored in the buffer 140 so as to create a payload. The UEP mode decision unit 190 provides information regarding the TDU (the number of bit levels included in the TDU) and the coding ratio for each TDU. In the case of the MPDU 750 shown in FIG. 4*a*, the same kinds of TDUs have the same coding ratio.

In general, error-protection coding is classified into block coding and convolution coding. In the case of the block coding (e.g., RS coding), data is encoded and decoded as blocks. In the case of the convolution coding, a predetermined length of memory is used to compare previous data with current data and perform coding based on the comparison. It is known in the art that the block coding is basically robust against burst errors, and the convolution coding against random errors. Results of the error-protection coding create a payload, i.e., an MPDU 750.

The header creation unit 160 creates a preamble 710, a PHY header 720, and an MAC header 730 and adds them to the MPDU 750, which consists of a plurality of coded TDUs, so as to create a transmission frame as shown in FIG. 4*a*.

The HRP mode index field 720*a* of the PHY header 720 has a mode index recorded therein. The mode index is a combination of grouping information (TDU grouping mode), a coding ratio, and a modulation mode. The mode index is provided by the UEP mode decision unit 190. In addition to the HRP mode index field 720*a*, the header creation unit 160 creates various types of fields 720*b*, 720*c*, 720*d*, and 720*f* shown in FIG. 4*b*.

The RF unit 170 modulates transmission packets in a modulation mode, which is provided by the UEP mode decision unit 190, and transmits them via an antenna.

The transmission-efficiency-determination unit 180 determines whether the transmission efficiency of uncompressed AV data drops below a predetermined threshold while the data is transmitted, based on an error response received by the transmission apparatus from the reception apparatus.

When it has been determined that the transmission efficiency has dropped below the threshold, the UEP mode decision unit 190 designates the UMR field 731, which is included in the MAC header 730, as 1 so as to request the reception apparatus to provide a UEP mode adapted to the current transmission efficiency. When the reception apparatus selects and recommends a UEP mode based on the request, the UEP mode decision unit 190 selects a mode, which is most suitable for the recommended UEP mode, from a table 195, e.g., the table shown in FIG. 5. As mentioned above, the mode index is a combination of grouping information, a coding ratio, and a modulation mode. The UEP mode decision unit 190 provides the channel coding unit 150 with the grouping information and the coding ratio, which are based on the mode index, and the RF unit 170 with the modulation mode based on the same. According to the selected UEP mode, the channel coding unit 150 codes uncompressed AV data, which is transmitted to the reception apparatus by the RF unit 170.

If the transmission efficiency drops below the threshold again, the channel coding unit 150 modifies the UEP mode and performs coding accordingly.

Figure 9:
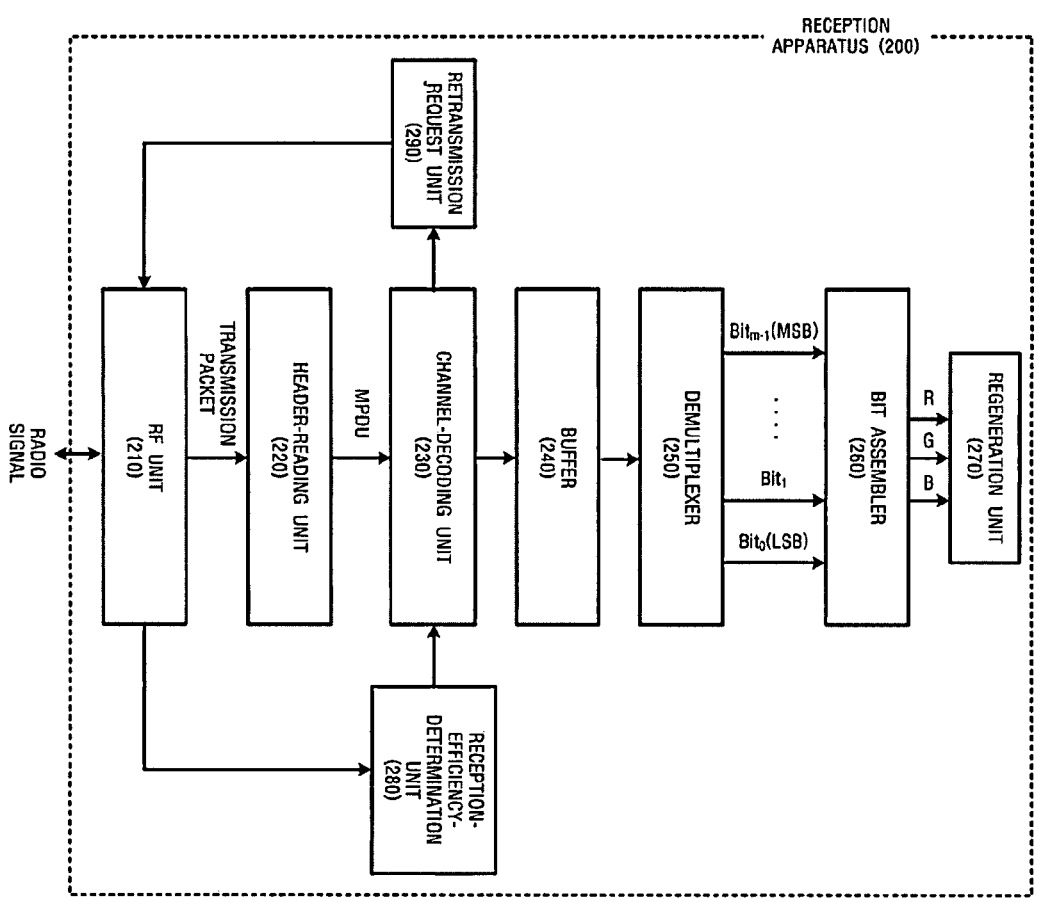
FIG. 9 shows the overall construction of an apparatus for receiving uncompressed AV data according to an exemplary embodiment of the present invention.

FIG. 9 shows the overall construction of an apparatus 200 for receiving uncompressed AV data according to an exemplary embodiment of the present invention. The reception apparatus 200 may include an RF unit 210, a header reading unit 220, a channel-decoding unit 230, a buffer 240, a demultiplexer 250, a bit assembler 260, a regeneration unit 270, a reception-efficiency-determination unit 280, and a retransmission request unit 290.

The RF unit 210 demodulates received radio signals and restores transmission packets. The header reading unit 220 reads the PHY header and the MAC header, which have been added by the header creation unit 160 shown in FIG. 8, and provides the channel-decoding unit 230 with an MPDU, from which the headers have been removed (i.e., a payload). The header reading unit 220 reads the mode index recorded in the HRP mode index field 720*a* of the PHY header 720, as well as various types of fields 720*b*, 720*c*, 720*d*, 720*e*, and 720*f* shown in FIG. 4*b*.

The reception-efficiency-determination unit 280 determines whether the reception efficiency of uncompressed AV data drops below a predetermined threshold while the data is received. When it has been determined that the reception efficiency has dropped below the threshold, the channel-decoding unit 230 checks whether a UEP mode is used and decodes the uncompressed AV data. During the decoding process, which is the inverse of the error protection process conducted by the channel coding unit 150, original data is restored from the codeword. A typical example of the error protection decoding is Viterbi decoding.

The retransmission request unit 290 checks if the UMR field included in the MAC header of received data has been designated as 1. If so, the retransmission request unit 290 requests the transmission apparatus 100 to retransmit uncompressed AV data, to which a UEP mode adapted to the current data reception rate is applied.

The buffer 240 temporarily stores TDUs, which have been restored through the error protection decoding, and provides them to the demultiplexer 250. The demultiplexer 250 demultiplexes the restored TDUs and separates them into bits of a plurality of bit levels. Particularly, the demultiplexer 250 successively separates them into the highest-level bits $Bit_{m-1}$ to the lowest-level bits $Bit_0$. When the pixel of video data consists of a plurality of sub-pixel components, the separated bits may be allocated to respective sub-pixel components. Such a demultiplexing process is the inverse of the multiplexing process conducted by the multiplexer 130 shown in FIG. 8.

The bit assembler 260 combines the separated bits of a plurality of bit levels (from the highest level to the lowest level) and restores uncompressed AV data (i.e. respective sub-pixel components), such as R, G, and B components, which are provided to the regeneration unit 270. After collecting respective sub-pixel component, i.e., pixel data, and completing a video frame, the regeneration unit 270 displays the video frame via a display device (not shown), such as a cathode ray tube (CRT), liquid crystal display (LCD), or plasma display panel (PDP), in accordance with a regeneration synchronization signal.

It should understood by those skilled in the art that, although video data has been given as an example of uncompressed AV data in the above description, the same method can be applied to uncompressed audio data, such as wave files.

Respective components shown in FIGS. 8 and 9 may be implemented as software executed in a specific region of a memory, such as tasks, classes, subroutines, processes, objects, and executable threads; hardware, such as field programmable gate array (FPGA) or application specific integrated circuit (ASIC); or a combination of such software and hardware. These components may be included in a computer-readable storage medium. Alternatively, parts of the components may be distributed in a plurality of computers.

Figure 10:
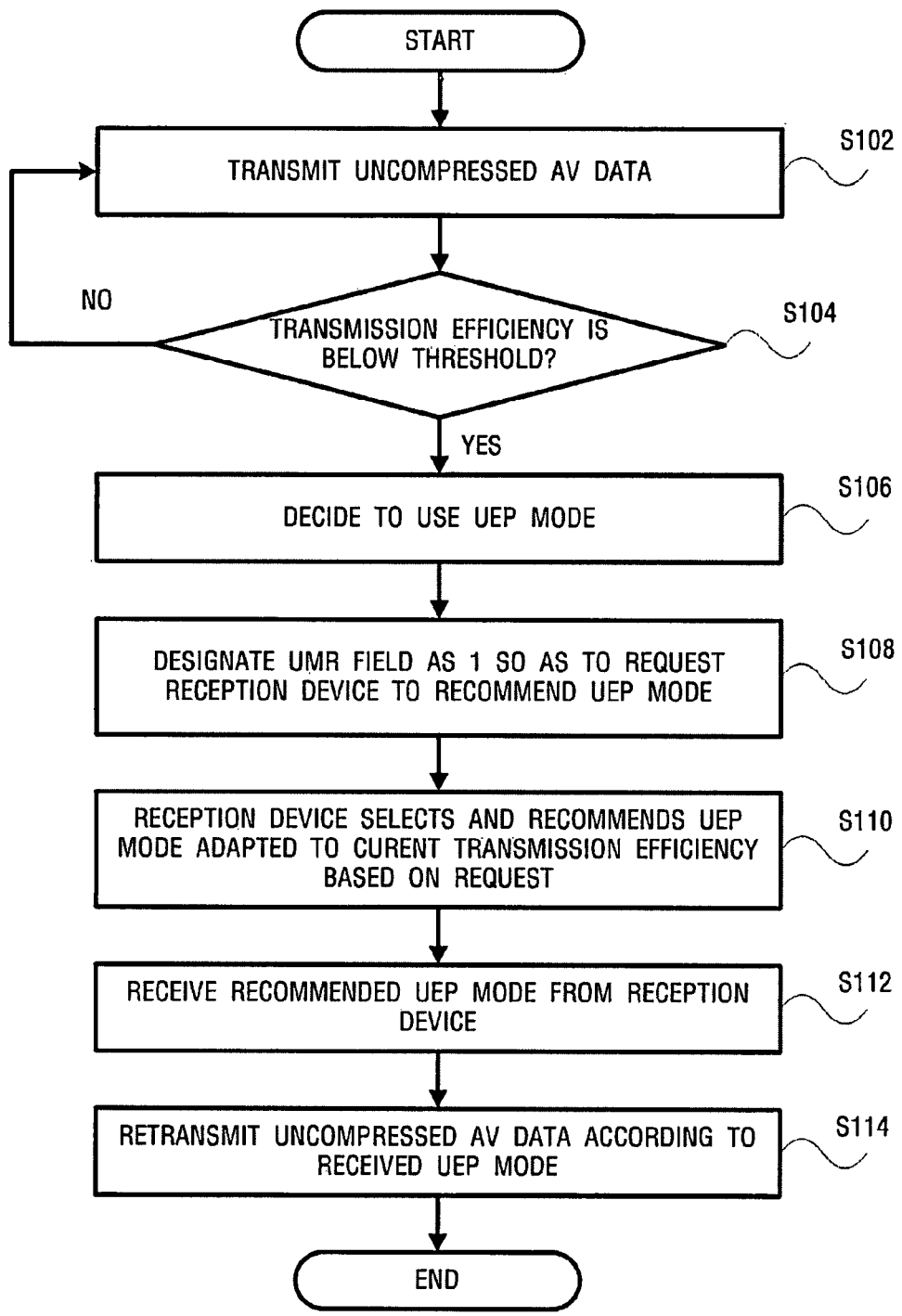
FIG. 10 is a flowchart showing a series of steps of a method for transmitting uncompressed AV data according to an exemplary embodiment of the present invention.

FIG. 10 is a flowchart showing a series of steps of a method for transmitting uncompressed AV data according to an exemplary embodiment of the present invention.

First, while uncompressed AV data is transmitted (S102), it is determined whether the transmission efficiency of the uncompressed AV data drops below a predetermined threshold (S104). If it has been determined that the transmission efficiency has dropped below the threshold, use of a UEP mode is decided (S106). In addition, the UMR field 731 included in the MAC header 730 is designated as 1 so as to request the reception device to recommend a UEP mode (S108). Based on the request, the reception device 200 selects and recommends a UEP mode adapted to the current transmission efficiency (S110). Then, the transmission device 100 receives the recommended UEP mode from the reception device 200 (S112.) Based on the received UEP mode, the transmission device 100 retransmits the uncompressed AV data (S114).

FIG. 11 is a flowchart showing a series of steps of a method for receiving uncompressed AV data according to an exemplary embodiment of the present invention.

First, while uncompressed AV data is received (S202), it is determined whether the reception efficiency of the uncompressed AV data drops below a predetermined threshold (S204). If it has been determined that the reception efficiency has dropped below the threshold, it is determined whether a UEP mode is used (S206). When the UEP mode is used, the transmission device 100 requests that a UEP mode adapted to the current data reception rate be recommended (S208). Based on the request, a UEP mode adapted to the current data reception rate is selected and recommended (S210). Based on the recommended UEP mode, the transmission device 100 is requested to retransmit the uncompressed AV data (S212).

As mentioned above when the channel condition degrades while uncompressed AV data is transmitted during high-frequency wireless communication via a bandwidth of Gbps grade, the frame structure of the MAC layer is used by the BB layer so as to switch to a UEP mode adapted to the current transmission efficiency and continue transmission at an improved transmission rate.

In addition, a transmission frame structure adapted to transmit large-capacity uncompressed AV data based on a UEP technique enables an efficient UEP process conforming to the significance of bits constituting the uncompressed AV data.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of transmitting uncompressed audio and/or video (AV) data, the method comprising:
   determining whether a transmission efficiency of uncompressed AV data drops below a threshold while the uncompressed AV data is transmitted;
   deciding to use an unequal error protection (UEP) mode when it is determined that the transmission efficiency has dropped below the threshold; and
   retransmitting the uncompressed AV data by using the UEP mode,
   wherein the UEP mode indicates a manner of dividing bits into significant bits and non-significant bits, and the bits constitute the uncompressed AV data, and
   wherein the retransmitting the uncompressed AV data comprises:
      receiving the UEP mode from a reception device; and
      retransmitting the uncompressed AV data in accordance with the received UEP mode.

2. The method of claim 1, wherein the deciding to use of the UEP mode is made based on a physical (PHY) header of the uncompressed AV data.

3. The method of claim 1, wherein the retransmitting the uncompressed AV data comprises:
   making a request that the reception device recommend the UEP mode by designating a UEP mode request (UMR) field as 1, the UMR field being contained in a media access control (MAC) header of the uncompressed AV data;
   selecting and recommending, by the reception device, the UEP mode adapted to a current transmission efficiency based on the request.

4. The method of claim 3, wherein the receiving the UEP mode from the reception device comprises receiving the UEP mode in a header of a frame received from the reception device.

5. The method of claim 3, wherein the making the request comprises setting up a URM identifier (UMRI) field in the MAC header, the UMRI field being endowed with an identifier (ID) of the UMR field, and transmitting a frame to the reception device, the frame containing the MAC header.

6. The method of claim 5, wherein the selecting and recommending the UEP mode comprises setting up a recommended UEP mode identifier (RUMI) field in the MAC header of the frame, the RUMI field being endowed with an ID of the UEP mode, and transmitting the frame to a transmission device, the frame containing the MAC header.

7. The method of claim 1, further comprising:
   modifying the UEP mode when the transmission efficiency has dropped below the threshold again; and
   retransmitting uncompressed AV data based on the modified UEP mode.

8. The method of claim 1, wherein the determining comprises receiving an error response from a reception device as a basis of determination, the reception device receiving the uncompressed AV data.

9. The method of claim 1, wherein, based on the manner of dividing bits into significant bits and non-significant bits, bits belonging to a predetermined number of high bit levels are selected from the bits constituting the uncompressed AV data and designated as the significant bits, and remaining bits are designated as the non-significant bits.

10. A method of receiving uncompressed audio and/or video (AV) data, the method comprising:
    determining whether a reception efficiency of uncompressed AV data drops below a threshold while the uncompressed AV data is being received;
    confirming, by a reception device, whether a first unequal error protection (UEP) mode is used for the uncompressed AV data, in response to determining that the reception efficiency has dropped below the threshold; and
    requesting, by the reception device, retransmission of the uncompressed AV data in response to confirming that the first UEP mode has been used,
    wherein the first UEP mode indicates a manner of dividing bits into significant bits and non-significant bits, and the bits constitute the uncompressed AV data, and
    wherein the requesting retransmission of uncompressed AV data comprises transmitting a second UEP mode to the transmission device and requesting the transmission device to retransmit the uncompressed AV data based on the second UEP mode.

11. The method of claim 10, wherein a physical (PHY) header of the uncompressed AV data contains information regarding whether the first UEP mode is used.

12. The method of claim 10, wherein the requesting retransmission of uncompressed AV data further comprises:
    determining whether a UEP mode request (UMR) field has been designated as 1, the UMR field being contained in a media access control (MAC) header of the uncompressed AV data;

receiving a request for recommendation of the second UEP mode adapted to a current data reception rate from a transmission device when it is determined that the UMR has been designated as 1; and selecting and recommending the second UEP mode adapted to the current data reception rate based on the request.

13. The method of claim 12, wherein the selecting and recommending the second UEP mode comprises:

setting up a recommended UEP mode identifier (RUMI) field in an MAC header of a received frame, the RUMI field being endowed with an identifier (ID) of the second UEP mode; and transmitting the received frame to the transmission device.

14. The method of claim 10, further comprising:

modifying the first UEP mode when the reception efficiency has dropped below the threshold again; and receiving uncompressed AV data again based on the modified first UEP mode.

15. The method of claim 10, wherein, based on the manner of dividing bits into significant bits and non-significant bits, bits belonging to a predetermined number of high bit levels are selected from the bits constituting the uncompressed AV data and are designated as significant bits, and remaining bits are designated as the non-significant bits.

16. An apparatus which transmits uncompressed audio and/or video (AV) data, the apparatus comprising:

a transmission-efficiency-determination unit which determines whether a transmission efficiency of uncompressed AV data drops below a threshold while the uncompressed AV data is transmitted;

an unequal error protection (UEP) mode decision unit which decides to use a UEP mode when the transmission-efficiency-determination unit determines that the transmission efficiency has dropped below the threshold;

a channel coding unit which performs coding of the uncompressed AV data by using the UEP mode; and an RF unit which retransmits the uncompressed AV data coded by the channel coding unit, wherein the first UEP mode indicates a manner of dividing bits into significant bits and non-significant bits, and the bits constitute the uncompressed AV data, and wherein the channel coding unit codes the uncompressed AV data in accordance with the UEP mode received from a reception device, and the RF unit retransmits the uncompressed AV data coded in accordance with the received UEP mode.

17. The apparatus of claim 16, wherein a physical (PHY) header of the uncompressed AV data contains information regarding the decision regarding use of the UEP mode.

18. The apparatus of claim 16, wherein the UEP mode decision unit makes a request that a reception device recommend the UEP mode adapted to a current transmission efficiency by designating a UEP mode request (UMR) field as 1, the UMR field being contained in a media access control (MAC) header of the uncompressed AV data, the UEP mode decision unit deciding to use the UEP mode recommended by the reception device based on the request.

19. The apparatus of claim 18, wherein the MAC header contains a UMR identifier (UMRI) field endowed with an identifier (ID) of the UMR field.

20. The apparatus of claim 16, wherein the channel coding unit modifies the UEP mode and performs coding when the transmission efficiency has dropped below the threshold again.

21. The apparatus of claim 16, wherein the transmission-efficiency-determination unit determines whether the transmission efficiency drops below the threshold based on an error response from a reception device that receives the uncompressed AV data.

22. The apparatus of claim 16, wherein, based on the manner of dividing bits into significant bits and non-significant bits, bits belonging to a predetermined number of high bit levels are selected from the bits constituting the uncompressed AV data and designated as the significant bits, and remaining bits are designated as the non-significant bits.

23. An apparatus which receives uncompressed audio and/or video (AV) data, comprising:

a reception-efficiency-determination unit which determines whether a reception efficiency of uncompressed AV data drops below a threshold while the uncompressed AV data is received;

a channel-decoding unit which confirms whether a first unequal error protection (UEP) mode is used for the uncompressed data and decodes the uncompressed AV data in response to the reception-efficiency-determination unit determining that the reception efficiency has dropped below the threshold; and a retransmission request unit which requests retransmission of the uncompressed AV data in response to the channel-decoding unit confirming that the first UEP mode has been used, wherein the first UEP mode indicates a manner of dividing bits into significant bits and non-significant bits, and the bits constitute the uncompressed AV data, and wherein the retransmission request unit transmits a second UEP mode to the transmission device and request the transmission device to retransmit the uncompressed AV data based on the second UEP mode.

24. The apparatus of claim 23, wherein a physical (PHY) header of the uncompressed AV data contains information regarding whether the first UEP mode is used.

25. The apparatus of claim 23, wherein the retransmission request unit determines whether a UEP mode request (UMR) field has been designated as 1, the UMR field being contained in a media access control (MAC) header of the uncompressed AV data, and selects and recommends the second UEP mode adapted to a current data reception rate when determining that the UMR has been designated as 1.

26. The apparatus of claim 25, wherein the MAC header of the uncompressed AV data contains a recommended UEP mode (RUM) field which designates the recommended UEP mode and a recommended UEP mode identifier (RUMI) field endowed with an identifier (ID) of the RUM field.

27. The apparatus of claim 23, wherein the retransmission request unit modifies the first UEP mode and requests retransmission of uncompressed AV data, the modified first UEP mode being applied to the uncompressed AV data, when the reception efficiency has dropped below the threshold again.

28. The apparatus of claim 23, wherein, based on the manner of dividing bits into significant bits and non-significant bits, bits belonging to a predetermined number of high bit levels are selected from the bits constituting the uncompressed AV data and designated as the significant bits, and remaining bits are designated as the non-significant bits.

29. A method of transmitting uncompressed audio and/or video (AV) data, the method comprising:

generating transmission frame structure which transmits the uncompressed AV data; and transmitting the transmission frame structure, wherein the transmission frame structure comprises:

a payload which comprises a plurality of transmission data units (TDUs) classified in accordance with significance of bits constituting the uncompressed AV data, the TDUs having been subjected to error-protection coding at a predetermined coding ratio;

a media access control (MAC) header added to the payload, a leak adaptation field (LAF) having been set up in the MAC header to code the uncompressed AV data by using a first unequal protection (UEP) mode indicating a manner of dividing bits, the bits constituting the uncompressed AV data, into significant bits and non-significant bits; and a physical (PHY) header added to the MAC header, the PHY header containing information regarding whether the first UEP mode is used, wherein the MAC header contains a UMR field and a UMRI field endowed with an identifier (ID) of the UMR field, the UMR field requesting a reception device to recommend a second UEP mode adapted to a current transmission efficiency, the recommended second UEP mode being used for retransmitting the uncompressed AV data.

30. The method of claim 29, wherein the UMR field designates a field value as 1 and requests recommendation of the second UEP mode when the transmission efficiency has dropped below a threshold.

31. The method of claim 29, wherein the PHY header further contains information regarding number of bit levels contained in the TDUs, information regarding a modulation mode, and information regarding a mode index indicating a combination of the information regarding number of bit levels and the information regarding a modulation mode.

32. The method of claim 29, wherein the MAC header contains a recommended UEP mode (RUM) field and a recommended UEP mode identifier (RUMI) field endowed with an ID of the RUM field, the RUM field recommending the second UEP mode adapted to the current data reception rate if a UEP mode request (UMR) field contained in an MAC header of received uncompressed AV data has been designated as 1.

33. The method of claim 32, wherein the RUM field is adapted to recommend a modified UEP mode when a reception efficiency has dropped below a threshold.

* * * * *